United States Patent [19]
Hallerbäck

[11] 3,772,542
[45] Nov. 13, 1973

[54] ELECTRIC MOTOR DRIVEN TOOL

[75] Inventor: Stig Lennart Hallerbäck, Vastra Frolunda, Sweden

[73] Assignee: SKF Industrial Trading and Development Company, Gateborg, Sweden

[22] Filed: Dec. 15, 1971

[21] Appl. No.: 208,278

[52] U.S. Cl. .................................. 310/50, 310/91
[51] Int. Cl. ............................................ H02k 7/14
[58] Field of Search ................... 310/50, 47, 89, 90, 310/91, 51, 85

[56] References Cited
UNITED STATES PATENTS

| | | | |
|---|---|---|---|
| 2,532,823 | 12/1950 | Schumann | 310/50 |
| 2,643,351 | 6/1953 | Feiertag | 310/51 |
| 3,524,088 | 8/1970 | Ryckmann | 310/50 |
| 2,696,569 | 12/1954 | Schumann | 310/51 |
| 3,432,703 | 3/1969 | Sheps | 310/50 |
| 3,344,291 | 9/1967 | Pratt | 310/50 |
| 3,699,825 | 10/1972 | Misuraca | 74/527 |

Primary Examiner—R. Skudy
Attorney—Dexter N. Shaw et al.

[57] ABSTRACT

An electric motor-actuated tool, preferably a hand tool for use at high rotational speeds, comprising a motor-spindle unit mounted in a tool cover with an end portion provided with an opening, which unit comprises a stator and a rotor and a relatively long spindle projecting at one side from the rotor, characterized by that the spindle is mounted in bearings firstly in bearing supports which are arranged in connection to the rotor and fixed to the stator, and secondly in an end bearing device connected to the open end part of the cover near the tool carrying part of the spindle which projects out of the cover, whereby the motor-spindle unit is movably supported in the cover for positioning of the motor independently of the movements of the cover caused by deformations.

1 Claim, 4 Drawing Figures

PATENTED NOV 13 1973 3,772,542

ELECTRIC MOTOR DRIVEN TOOL

The present invention relates to an electric motor-actuated tool, preferably a hand tool, which operates at high rotational speeds. A device of this kind is preferably designed to be lightweight and easy to handle during all working conditions. Therefore, it is natural that a plastic material is chosen for the cover which surrounds the motor of such a tool. Thereby the cover can have a small wall thickness but still have a good surface strength and impact resistance. When an electric motor is built in a cover of relatively extended shape which can be deformed and subjected to length extensions during operation due to external conditions, certain problems can arise and, in order to secure the operating reliability, these problems must be solved. When a small electric motor is used in such an application, certain precision requirements must be fulfilled. The motor has to operate with a good centering and small air gaps in order to be fully operable. When mounting a motor in a tool with a relatively weak cover, a displacement can be transmitted by the spindle of the tool between an end bearing for this spindle and the rotor bearings which are necessary for the functioning of the motor when the tool is pressed against a work piece due to a rigid mounting of the motor in the cover. This might mean that the motor fails to work and a breakdown occurs.

The object of the invention is to eliminate this disadvantage, and the invention is mainly characterized in that the spindle is mounted in bearings firstly in bearing supports which are arranged in connection to the rotor and fixed to the stator, and secondly in an end bearing device connected to the open end part of the cover near the tool carrying part of the spindle which projects out of the cover in which the motor-spindle unit is movably supported for positioning of the motor independently of the movements of the cover caused by deformation.

The invention will now be closer described in connection to the accompanying drawing in which.

Figure 1:
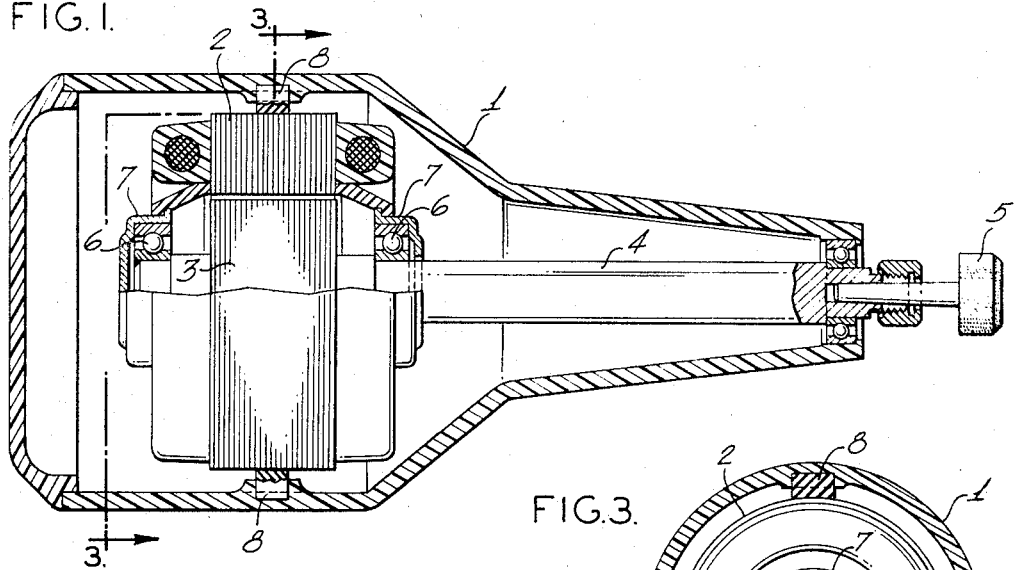
FIG. 1 shows a longitudinal section through a device according to the invention which is applied in a tool, here drafted as a hand grinding machine.
Figure 3:
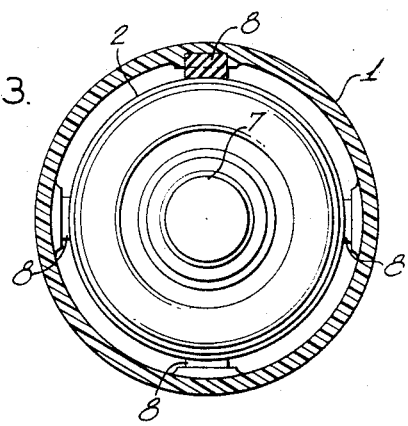
FIG. 3 is a sectional view taken on line 3—3 of FIG. 1.

The embodiment according to FIG. 1 in the shape of a hand grinding machine shows a tool cover 1 and an electric motor which is built into this cover. The motor comprises a stator 2 and a rotor 3. A spindle 4 is projecting from the rotor. At that end of the spindle which projects out of the cover, a grinding wheel 5 is mounted. The rotor is supported by bearings 6 here shown as single row deep groove ball bearings, but any suitable type of sliding or rolling bearings can be used. The bearings are mounted in bearing supports 7, which are fixed to the stator 2. Because as mentioned above the cover can be deformed, in order not to jeopardize the functioning of the motor when the tool is pressed to a work piece and the rigid motor-spindle unit is forced out of alignment, an elastic suspension of the motor-spindle system is provided so that a certain movement can take place. This is achieved by that elastic members 8 in shape of, for instance rubber blocks, are arranged between the stator and the cover. It is also possible to use a ring-shaped member, which may comprise broader segments. The rubber member is suitably so arranged in relationship to the stator that the latter has a possibility to move axially when the cover is subjected to length variations.

Figure 2:
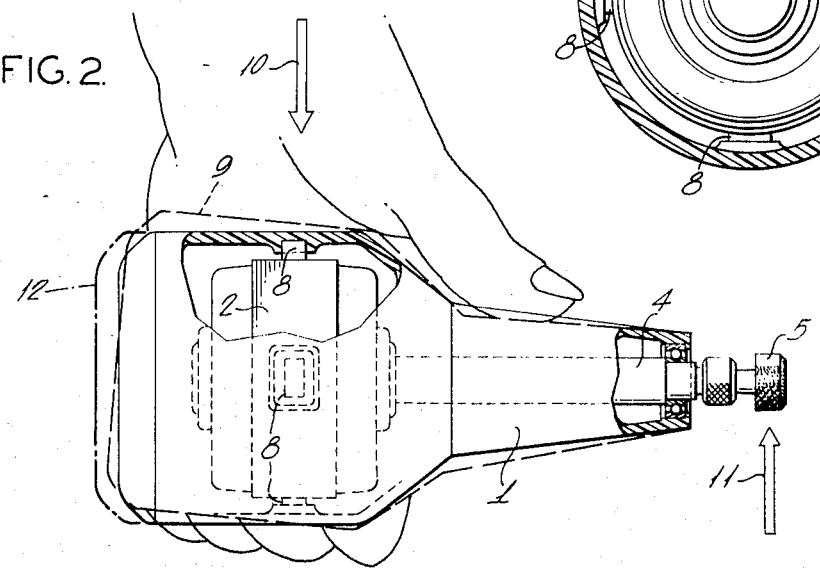
FIG. 2 shows diagrammatically what happens when the tool is pressed against a work piece.

In FIG. 2 is shown how the motor-spindle unit will perform in action. It is desired that the unit be in position even when the weak cover (shown by dotted lines at 9) is deformed due to the forces from the hand 10 and the reaction force at the arrow 11, or due to length variations (12) which can occur because of the heat transmitted from the hand.

Figure 4:
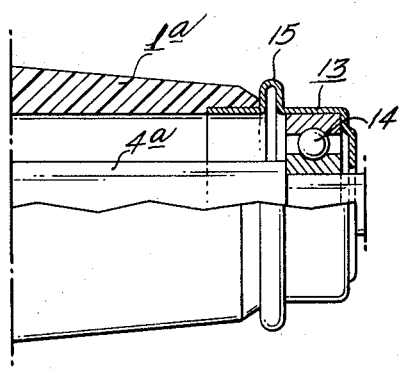
FIG. 4 is a partial sectional view showing a modified cup arrangement for mounting the bearing.

Small electric motors must operate with an accurate centering and small air gaps in order to be functioning correctly, and this must not be affected by a displacement in the system. In order to make the spindle support self-aligning and to achieve a stable system, it is suitable — which is shown in FIG. 4 — to make the end bearing application for the spindle 4a elastic. As an example, the figure shows how a cup 13 with a bearing 14 of a suitable type is fixed to the opening of the cover 1a. In order to provide for a resilient operation, the cup is provided with a fold 15. This resilient action can also be achieved if the cup is provided with a rubber element in the shape of a ring or the like at the fixing point. A self-aligning bearing of a suitable type could also be used.

The invention is not limited to the above described embodiments, but it can be varied in many ways within the scope of the following claims.

I claim:

1. Electric motor-actuated tool comprising a hollow housing, a motor-spindle assembly mounted in the housing, said assembly including a stator, a rotor and a spindle projecting from the rotor, first bearing support means fixed to said stator, said bearing support means mounting a pair of bearings rotatably journalling said spindle adjacent one end, the oposite end of said spindle projecting through an opening in said housing adapted to mount a tool, second bearing means rotatably supporting said spindle at said opposite end, resilient means comprising a plurality of rubber block members mounting said stator in said housing thereby moveably supporting said motor-spindle assembly in said housing for adjusting movement independent of said housing caused by deformations, and means comprising a cup member supporting said second bearing means at one end and engageable in the housing at the opposite end, said cup member having a radially outwardly directed folded portion engageable with the portion of the housing adjacent said opening and providing resilient support means.

* * * * *